(12) United States Patent
Koide et al.

(10) Patent No.: US 9,435,678 B2
(45) Date of Patent: Sep. 6, 2016

(54) LIQUID LEVEL DETECTION DEVICE

(71) Applicant: NIPPON SEIKI CO., LTD., Niigata (JP)

(72) Inventors: Shigeki Koide, Niigata (JP); Keiji Tsurumaki, Niigata (JP); Hisahito Ichisawa, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 100 days.

(21) Appl. No.: 14/403,933

(22) PCT Filed: Jun. 5, 2013

(86) PCT No.: PCT/JP2013/065522
§ 371 (c)(1),
(2) Date: Nov. 25, 2014

(87) PCT Pub. No.: WO2014/002709
PCT Pub. Date: Jan. 3, 2014

(65) Prior Publication Data
US 2015/0185066 A1    Jul. 2, 2015

(30) Foreign Application Priority Data
Jun. 28, 2012 (JP) ................................. 2012-145755

(51) Int. Cl.
*G01F 23/36* (2006.01)
(52) U.S. Cl.
CPC ............. *G01F 23/36* (2013.01); *G01F 23/363* (2013.01)
(58) Field of Classification Search
CPC ........................... G01F 23/36; G01F 23/363
USPC ...... 73/317, 313, 290 R, 305, 319, 309, 318, 73/816.77; 340/623, 625, 624
See application file for complete search history.

(56) References Cited

U.S. PATENT DOCUMENTS

| | | | |
|---|---|---|---|
| 4,928,526 A | 5/1990 | Weaver | |
| 5,216,919 A * | 6/1993 | Nelson ................... | G01F 23/36 338/33 |
| 6,209,392 B1 * | 4/2001 | Rapala ................... | G01F 23/36 338/33 |
| 2004/0055581 A1 | 3/2004 | Okazono et al. | |
| 2008/0053219 A1 * | 3/2008 | Ireland .................. | G01F 23/363 73/313 |

FOREIGN PATENT DOCUMENTS

| | | |
|---|---|---|
| JP | 60-163318 U | 10/1985 |
| JP | 02-189428 A | 7/1990 |
| JP | 10-288106 A | 10/1998 |
| JP | 2004-108263 A | 4/2004 |

OTHER PUBLICATIONS

International Search Report issued in PCT/JP2013/065522, dated Jul. 16, 2013, with English translation.

* cited by examiner

*Primary Examiner* — Hezron E Williams
*Assistant Examiner* — Marrit Eyassu
(74) *Attorney, Agent, or Firm* — McDermott Will & Emery LLP

(57) ABSTRACT

A liquid level detection device is configured so as to reduce or eliminate the contact between electrical cords led out of a detection section. A liquid level detection device is provided with: a detection section which detects the position of a liquid surface on the basis of the rotation of a rotation section rotating as a float is displaced; a plate-like mounting plate section, one surface of which is a mounting surface to which the detection section is mounted; a flange section which is mounted to a tank for containing liquid; and first and second electrical cords which are led out of the detection section toward the flange section. A branch section which comprises a through-hole is provided in the mounting plate section. The second electrical cord passes through the branch section and is routed around from the mounting surface side of the mounting plate section to the back surface side thereof.

5 Claims, 7 Drawing Sheets (a)

(b)

LIQUID LEVEL DETECTION DEVICE

RELATED APPLICATIONS

This application is the U.S. National Phase under 35 U.S.C. §371 of International Application No. PCT/JP2013/065522, filed on Jun. 5, 2013, which in turn claims the benefit of Japanese Application No. 2012-145755, filed on Jun. 28, 2012, the disclosures of which applications are incorporated by reference herein.

TECHNICAL FIELD

The present invention relates to a liquid level detection device.

BACKGROUND ART

As a liquid level detection device to detect a position of a liquid surface (a liquid level) of various kinds of liquids (such as fuels) in a tank which is included in a vehicle (such as an automotive), for example, there is the one disclosed in Patent Literature 1.

The liquid level detection device disclosed in Patent Literature 1 (a liquid shutout valve device 1 in the same literature) is provided with: a flange section for fixing the liquid level detection device to a tank; and a detection section (a gauge unit 21) which is mounted to a mounting plate formed so as to hang down from this flange section, and which detects a liquid position of a liquid housed in the tank, and this device is also obtained as a construction in which two electrical cords (lead wires 25a, 25b) led out from the detection section are routed to the flange section side at one face side of the mounting plate (refer to FIG. 2 (b) of the same literature).

CITATION LIST

Patent Literature

Patent Literature 1: Japanese Unexamined Patent Application Publication No. 10-288106

SUMMARY OF THE INVENTION

Problems to be Solved by the Invention

As in the liquid level detection device according to Patent Literature 1, in a construction in which a plurality of electrical cords are positioned at one face side of the mounting plate, there is an apprehension that the cords come into frictional contact with each other and rub against each other due to vibration (for example, vibration transmitted from a carrier such as a vehicle), whereby coatings of the electrical cords are frictionally worn each other. If the coatings of the electrical cords are frictionally worn each other, it is undeniable that there may be a possibility that core wires thereof are exposed. If the core wires come into contact with each other, since short-circuit (shoring) may arise, there has been room for improvement from the viewpoint of failsafe.

The present invention has been made in view of the circumstance mentioned above, and it is an object of the present invention to provide a liquid level detection device with a construction thereof which is capable of reducing or eliminating contacting of a plurality of electrical cords which are led out from a detection section.

Means for Solving the Problem

In order to achieve the above object,

A liquid level detection device according to the present invention comprising:

a detection section having a rotation section which is connected via a float floating on a liquid surface of a liquid and an arm, and which rotates around a predetermined rotary shaft with displacement of the float, the detection section detecting a position of the liquid surface, based on rotation of the rotation section;

a frame body having:
  a plate-shaped mounting plate section, one surface of which is a mounting surface to which the detection section is mounted, and the other surface of which is a back surface opposite to the mounting surface; and
  a plate-shaped flange section which comes up in a direction which is orthogonal to the mounting surface and the back surface from one end of the mounting plate section, and which is mounted to a tank housing the liquid;

first and second electrical cords which are led out from the detection section toward the flange section;

a first terminal, one end part of which is a connection portion to be connected to a tip end part of the first electrical cord at the bottom surface side that is a surface at the detection section side of the flange section, and the other end of which arrives at the top surface side that is a surface opposite to the bottom surface of the flange section, and further, the other end of which is an external connection portion which can be connected to a predetermined external device; and a second terminal, one end part of which is a connection portion to be connected to a tip end part of the second electrical cord at the bottom surface side of the flange section, and the other end of which arrives at the top surface side of the flange section, and further, the other end of which is an external connection portion section which can be connected to the external device, wherein, at the mounting plate section, a branch section made of a through hole or a cutout is provided between the detection section and the flange section, the second electrical cord passes through the branch section to thereby bypass from the mounting surface side of the mounting plate section to the back surface side, the tip end part of the second electrical cord is positioned at the back surface side of the mounting plate section, the connection portion of the first terminal is positioned at the mounting surface side of the mounting plate section, the connection portion of the second terminal is positioned at the back surface side of the mounting plate section, the connection portion of the first terminal and the tip end part of the first electrical cord are connected to each other at the mounting surface side of the mounting plate section, and the connection portion of the second terminal and the tip end part of the second electrical cord are connected to each other at the back surface side of the mounting plate section.

Effect of the Invention

According to the present invention, it is possible to reduce or eliminate contacting of a plurality of electrical cords which are led out from a detection section.

MODE FOR CARRYING OUT THE INVENTION

Figure 1:
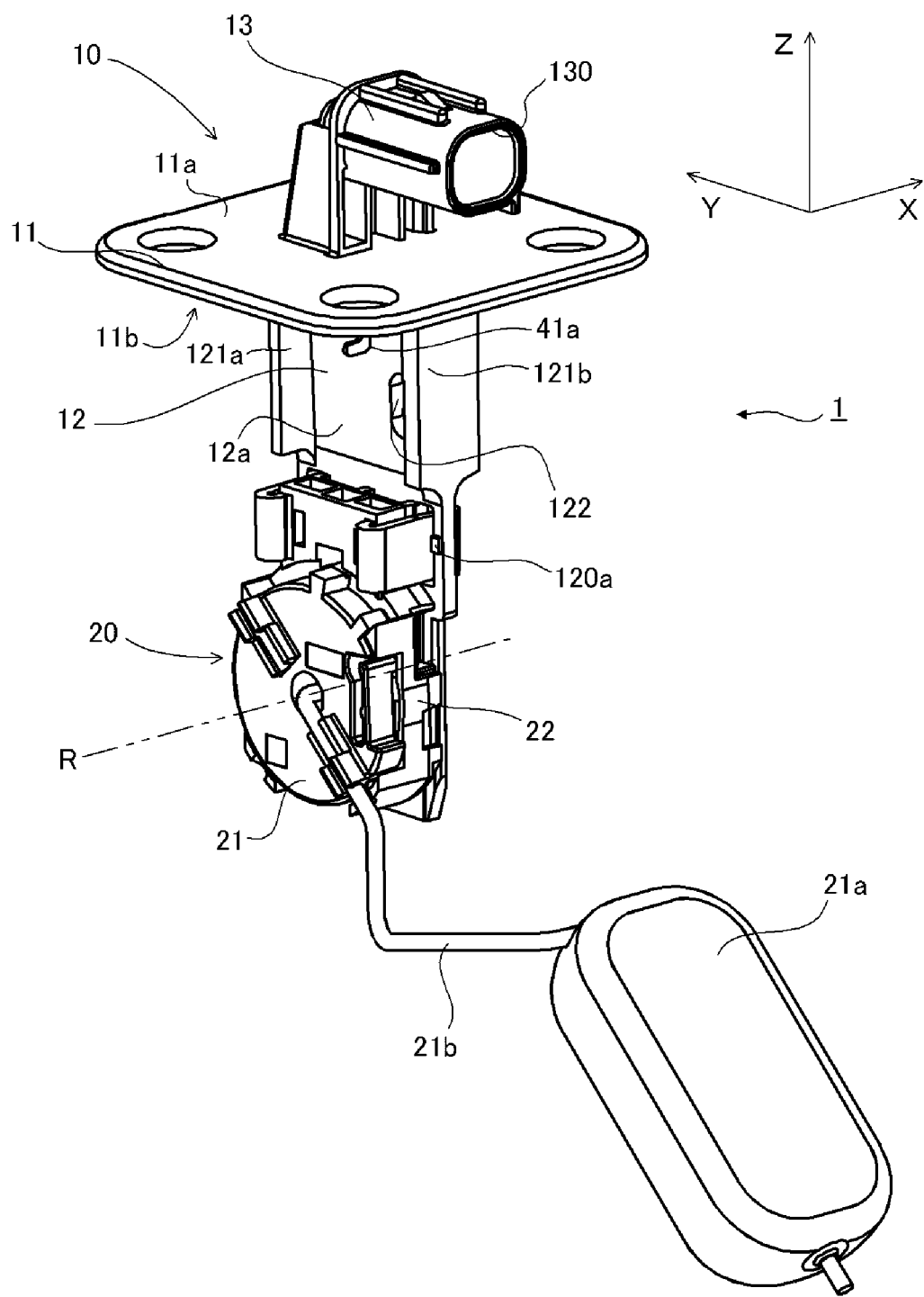
FIG. 1 is a perspective view of a liquid level detection device according to one embodiment of the present invention.
Figure 2:
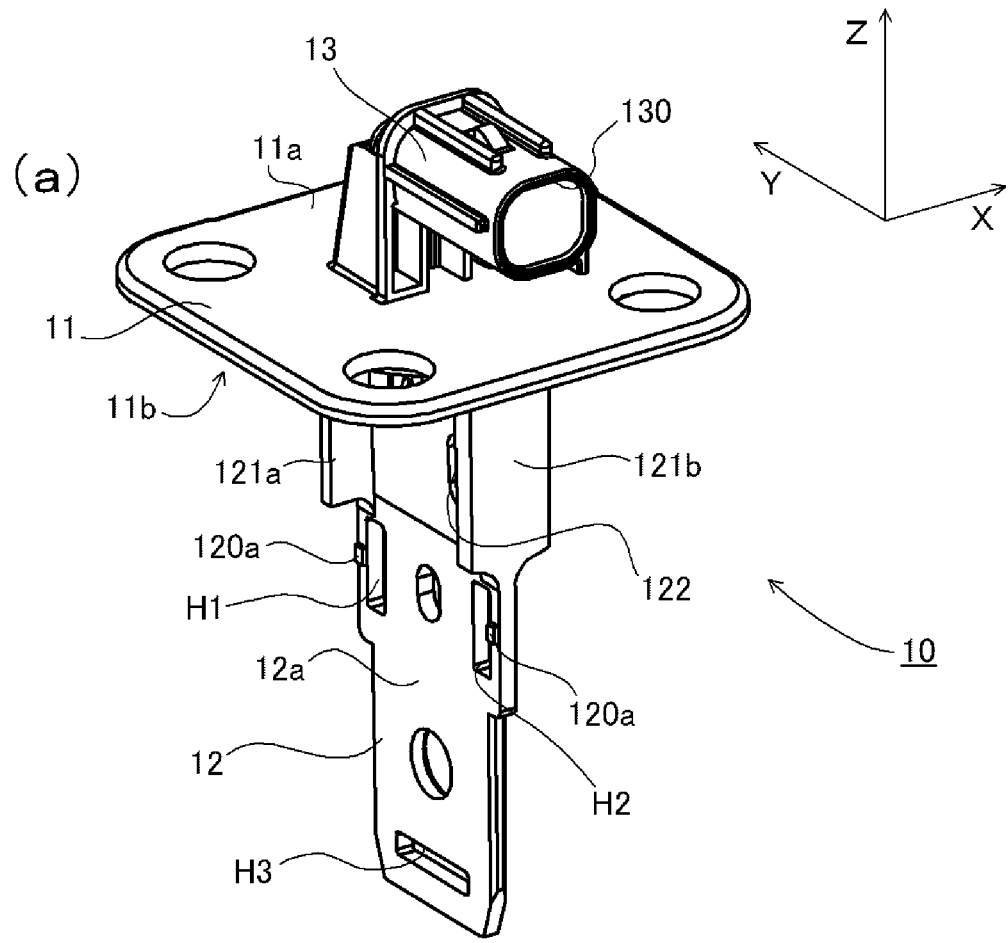
FIG. 2(a) is a perspective view of a frame body.
FIG. 2(b) is a view for explaining a reinforcement plate and packing.
Figure 2:
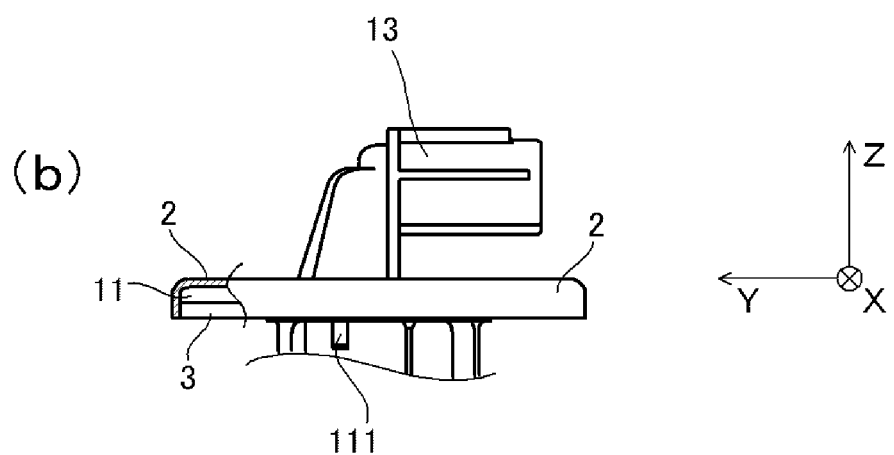
Figure 3:
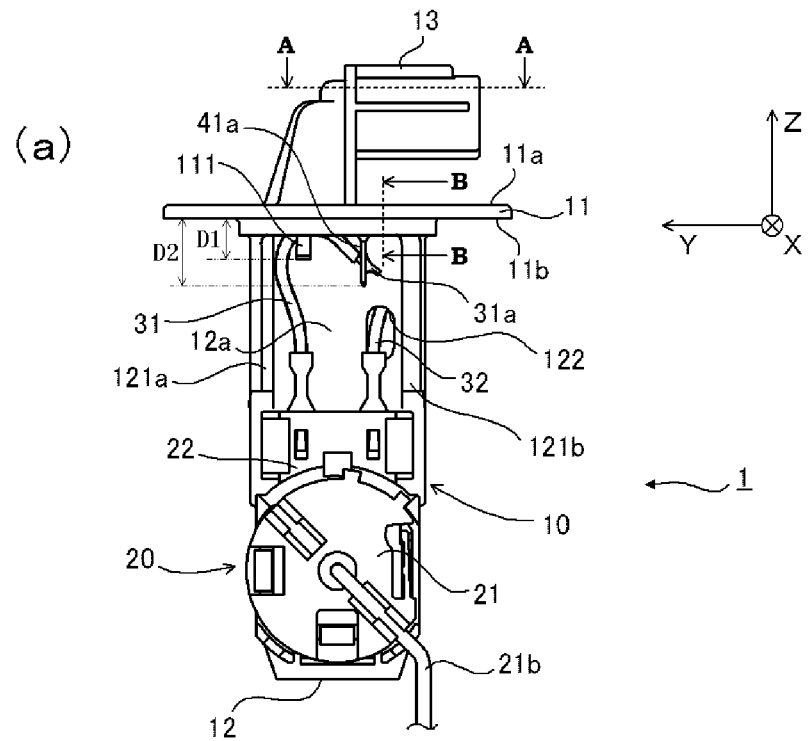
FIG. 3(a) is a view in a case where the liquid level detection device of FIG. 1 is seen from a side at which a detection section is mounted.
FIG. 3(b) is a view seen from a back side thereof.
Figure 3:
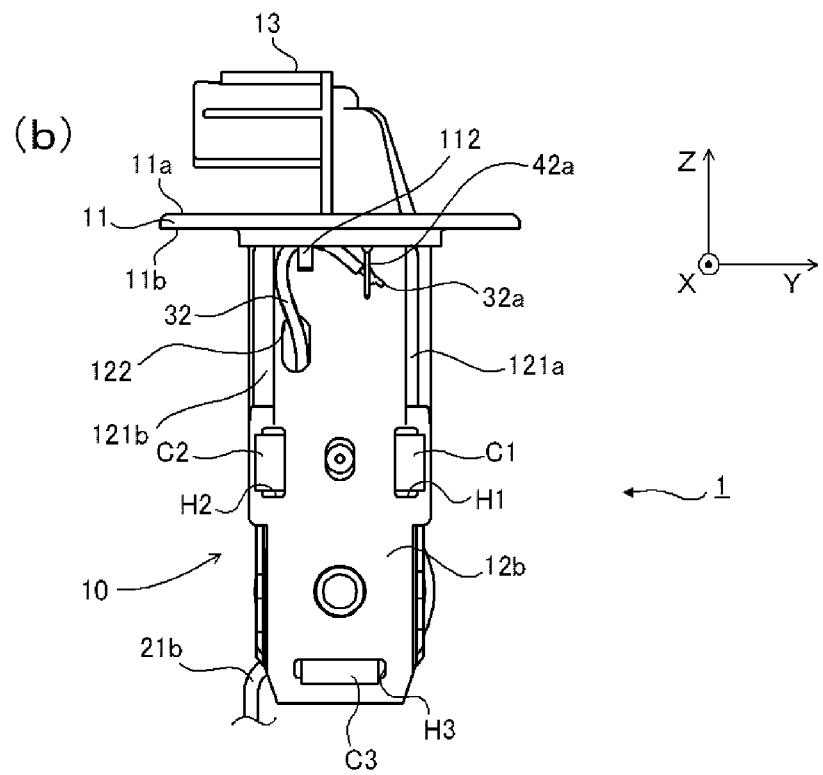

A liquid level detection device according to one embodiment of the present invention will be described with reference to the drawings.

A liquid level detection device 1 detects a position of a liquid surface (liquid level) of various kinds of liquids (such as fuels) in a tank which is included in a carrier (such as a motor vehicle), for example, and is provided with a frame body 10, a detection section 20, a first electrical cord 31, a second electrical cord 32, a first terminal 41, and a second terminal 42, as shown in FIG. 1 to FIG. 4.

It is to be noted that in FIG. 1, the first and second electrical cords 31 and 32 are not shown.

Hereinafter, in order to make it easy to comprehend a construction of the liquid level detection device 1, a description will be given by appropriately employing X, Y, and X axes which are orthogonal to each other, shown in FIG. 1 or the like. Also, directions which are respectively oriented by the arrows indicating the directions of X, Y, and Z axes are defined as positive (plus) sides in the respective axial directions, and the opposite directions are defined as negative (minus) sides in the respective axis directions.

A frame body 10 is made of a predetermined resin (for example, a polyacetal (POM) resin), and is constructed so that a flange sections 11, a mounting plate section 12, and a connector cover section 13 are integrally formed, as mainly shown in FIG. 2(a).

The flange section 11 is a portion which comes up from one end of the mounting plate section 12 (an end part at the positive Z direction side), and which is mounted to a liquid-housing tank (not shown) such as a fuel tank. The flange section 11 forms a flat plate shape broadening in a facial direction which is parallel to an X-Y plane. This flange section 11 is fixed to the tank by fixing means such as screws, whereby the liquid level detection device 1 is mounted to the tank. In a state in which the liquid level detection device 1 is mounted to the tank, a portion which is lower than the flange section 11 (at the negative Z direction side) is positioned in the tank. Specifically, as shown in FIG. 2(b), the flange section 11 is mounted to the tank via packing 3 together with a reinforcement plate 2 which is arranged on a top surface 11a thereof (a surface which is oriented in the positive Z direction).

The reinforcement plate 2 is made of a ferrous material or the like, and covers the flange section 11 from the top surface 11a. The packing 3 is made of a rubber material such as a nitrile rubber (NBR), and is arranged on a bottom surface 11b of the flange section 11 (a surface which is oriented in the negative Z direction).

On the bottom surface 11b of the flange section 11, there are formed: a first pressing section 111 to fix a part of the first electrical cord 31; and a second pressing section 112 to fix a part of the second electrical cord 32.

The first and second pressing sections 111, 112 each form a recessed shape, and in the recessed portions, the parts of the first and second electrical cords 31, 32 are pressed so that the first and second electrical cords 31, 32 do not substantially move in the X direction, in particular. In this manner, since the first and second electrical cords 31, 32 and the mounting plate section 12 hardly rub against each other due to vibration or the like, a risk that the first and second electrical cords 31, 32 may break can be reduced. Also, the recessed portions of the first and second pressing sections 111, 112 are respectively somewhat larger in depth than diameters of the first and second electrical cords 31, 32, and arrangement of the first and second electrical cords 31, 32 is made easy. The first pressing section 111 is positioned at the mounting surface 12a side, which will be described later, of the mounting plate section 12, and the second pressing section 112 is positioned at the back surface 12b side, which will be described later, of the mounting plate section 12.

The mounting plate section 12 is a portion to which the detection section 20 is to be mounted. The mounting plate section 12 is provided at the bottom plate 11b side of the flange section 11, and extends in a direction which is orthogonal to the bottom surface 11b. The mounting plate section 12 forms a substantially flat plate shape widening in a facial direction which is parallel to a Y-Z plane.

Figure 6:
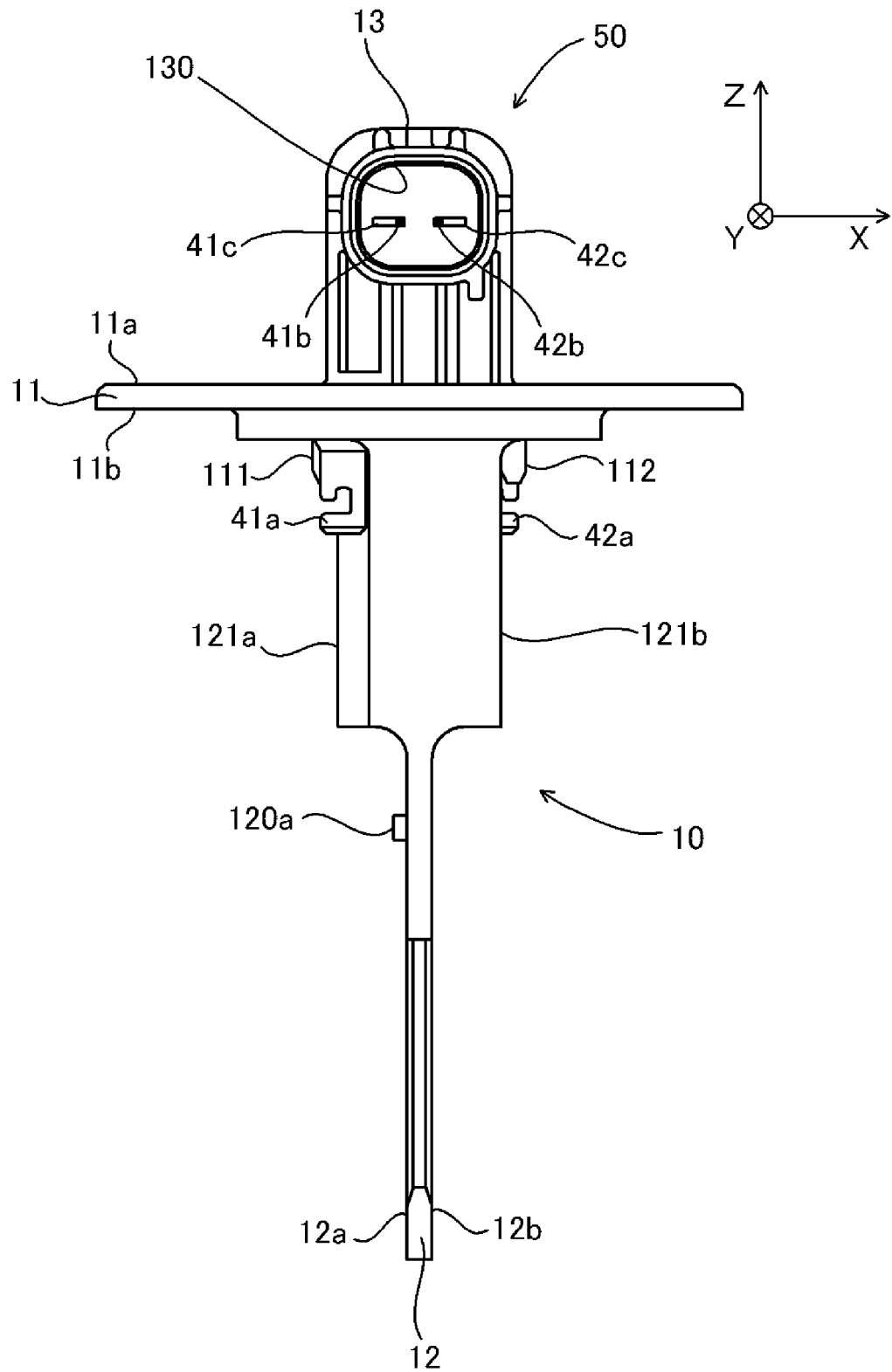
FIG. 6 is view in a case where the liquid level detection device is seen from an opening portion side of a connector cover section.

A surface which is oriented in the negative X direction of the mounting plate section 12 is constructed as a mounting surface 12a to which the detection section 20 is to be mounted. A surface which is oriented in the positive X direction of the mounting plate section 12 is obtained as a back surface 12b of the mounting surface 12a. On the mounting surface 12a of the mounting plate section 12, there is formed a restraining section 120a (refer to FIG. 2(a), FIG. 6 or the like) which is made of a protrusion portion to restrain the detection section 20 so as not to be mounted from the back surface 12b side. This function will be described later.

At both ends in the Y direction of the mounting plate section 12, wall portions 121a, 121b standing in the normal direction of the mounting surface 12a and the back surface 12b are formed integrally with the mounting plate section 12. Namely, the wall portions 121a, 121b stands along the X-Z plane direction, and is formed so that reinforcement of the mounting plate section 12 formed in a substantial plate shape is made.

At the mounting plate section 12, a branch section 122 made of a hole penetrating the mounting plate section 12 in the X direction is provided between the detection section 20 and the flange section 11. This function will be described later.

The connector cover section 12 is provided at the top surface 11a side of the flange section 11, and parts of the first and second terminals 41, 42 are exposed to the outside. A connector section 50 (a direct coupler section) is composed of the parts of the first and second terminals 41, 42 (external connection portions 41b, 42b which will be described later) and the connector cover section 13. This connector section 50 can be connected to a terminal of a predetermined external device, whereby a detection signal of the detection section 20 can be supplied to the connected external device. The external device having acquired the detection signal obtains a liquid residue value (for example, a value of a remaining fuel) in a tank on the basis of the acquired detection signal. An opening portion 130 of the connector cover section 13 opens toward a direction which is parallel to the top surface 11a of the flange section 11.

The detection section 20 is provided with: a rotation section 21; and a casing body 22 to rotatably retain the rotation section 21. The rotation section 21 and the casing body 22 are formed of a predetermined resin.

The rotation section 21 is a substantially cylindrical member made of a predetermined resin, and is connected via an arm 21b to a float 21a which floats on a liquid surface of the liquid housed in the tank, as shown in FIG. 1. The rotation section 21 rotates around a rotary shaft R which is parallel to the X axis with displacement of the float 21a.

The float 21a is a float which is formed in a substantially bale-like shape made of a synthetic resin or a metallic material. The float 21a floats on a liquid surface while the float is subjected to a floating force from the liquid in the tank, and displaces with fluctuation of a liquid level.

The arm 21b is a rod made of a metal, and to one end part thereof, the float 21a is mounted. The other end part of the arm 21b is retained by the rotation section 21.

The casing body 22 is made of a predetermined resin, and rotatably retains the rotation section 21. Also, the casing body 22 is fixed from the mounting surface 12a side to the mounting plate section 12. Specifically, claw portions C1, C2, C3 are formed in the casing body 22 (refer to FIG. 3(b)), and these claw portions respectively engage with mounting holes H1, H2, H3 which are provided at the mounting plate portion 12, whereby the casing body 22 is fixed to the mounting plate section 12. In this manner, the detection section 20 is mounted to the mounting surface 12a side of the mounting plate section 12.

Here, the detection section 20 is restrained by the restraining section 120a mentioned previously so as not to be mounted from the back surface 12b side of the mounting plate section 12.

Specifically, the restraining section 120a made of a protrusion portion is formed at the mounting surface 12a side of the mounting plate portion 12, in other words, in the vicinity of each of the mounting holes H1, H2 that are positioned at left and right end parts in FIG. 2(a) of the mounting plate section 12, whereby, even if the claw portions C1, C2, C3 are respectively caused to engage with the mounting holes H1, H2, H3 in an attempt to mount the detection section 20 from the back surface 12n side, since the restraining section 120a is present, the claw portions C1, C2 are respectively designed so as not to engage with the mounting holes H1, H2. Namely, the restraining section 120a is formed as a protrusion portion having a height (a height in the X direction) to an extent such that the claw portions C1, C2 and the mounting holes H1, H2 do not completely engage with each other. In this manner, merely by providing the restraining section 120a made of the protrusion portion, at the time of assembling, it is possible to prevent the detection section 20 from being mounted from the back surface 12b side of the mounting plate section 12; and therefore, incorrect assembling can be prevented owing to a simple construction. It is to be noted that the restraining section 120a may be provided by only one in the vicinity of any one of the mounting holes H1, H2, H3, or alternatively, may be provided (namely, by three) in the vicinities of all of these mounting holes.

Inside of the casing body 22, there is provided a circuit board (a printed circuit board), although not shown, on which a plurality of electrodes and resistors to connect to the plurality of electrodes are formed. At the back side of the rotation section 21, a contact point (not shown) made of a metal is provided, and if this contact point comes into contact with any one of the plurality of electrodes that are formed on the circuit board, a resistance value of a resistor which corresponds to the contacted electrode is output as a detection signal from the detection section 20. In this manner, the detection section 20 is constructed as a slide resistance type detection section to slide a contact point on a resistor on the basis of operation of the arm 21b that is connected to the float 21a.

The first and second electrical cords 31, 32 are connected to be electrically conductive to the circuit board, and are routed from the detection section 20 toward the flange section 11 (namely, in the positive Z direction). Specifically, the first electrical cord 31 is constructed as a GND (ground) line, and the second electrical cord 32 is constructed as a signal line for outputting the detection signal. It is to be noted that the first electrical cord 31 may be constructed as a signal line, and the second electrical cord 32 may be constructed as a GND line.

The first electrical cord 31 is led out from the detection section 20 toward the flange section 11, a tip end part 31a of which is oriented to the detection section 20 side so as to return on its way. The tip end part 31a is a portion at which no coating is provided and at which a core wire is exposed, and is also a portion to be connected to a first terminal 41 (a connection portion 41a, which will be described later, of the first terminal 41) by way of soldering.

Specifically, as shown in FIG. 3(a), the first electrical cord 31 extends from the detection section 20 side in the positive Z direction so as to be taken along a wall portion 121a, the tip end part 31a of which is approximately oriented in the negative Z direction so as to return at a position which is closer to the bottom surface 11b of the flange section 11 than the connection portion 41a, which will be described later, of the first terminal 41. In this manner, the first electrical cord 31, as shown in FIG. 3(a), slackens in a claw shape. All of the first electrical cord 31 is positioned at the mounting surface 12a side of the mounting plate section 12.

Here, the first pressing section 111 is positioned to be closer to the bottom surface 11b of the flange section 11 than the connection portion 41a, which will be described later, of the first terminal 41, and presses the vicinity of a return portion of the first electrical cord 31. In this manner, at the time of a work of connecting the first electrical cord 31 and the first terminal 41 to each other by way of soldering, the orientation of the tip end part 31a is easily determined from the return portion of the first electrical cord 31, and soldering can also be easily performed. Further, since the first electrical cord 31 is pressed by the first pressing section 111 in the vicinity of the return portion thereof, in particular, the vicinity of the site to come into connection to the first terminal 41 (namely, the vicinity of the connection portion 41a) hardly moves due to vibration or the like. Thus, a load applied to a soldering site between the first electrical cord 31 and the first terminal 41 is reduced. In the liquid level detection device 1 according to the embodiment, by such a structure, the reliability of electrical connection between the first electrical cord 31 and the first terminal 41 is ensured.

It is to be noted that the fact that the first pressing section 111 is positioned to be closer to the bottom surface 11b of the flange section 11 than the connection portion 41a, which will be described later, of the first terminal 41, designates that, as one example, as shown in FIG. 3(a), a distance D1 between the bottom surface 11b and a lower end of the first pressing section 111 (an end part in the negative Z direction) is shorter than a distance D2 between the bottom face 11b and a lower end of the connection portion 41a of the first terminal 41. Also, the wall portion 121a also has a function to restrain the first electrical cord 31 so as not to move to the positive Y direction side.

The second electrical cord 32 is led out from the detection section 20 toward the flange section 11, a tip end part 32a of which is oriented to the detection section 20 side so as to return on its way. The tip end part 32a is a portion at which no coating is provided and at which a core wire is exposed, and is also a portion to be connected to the second terminal 42 (a connection portion 42a, which will be described later, of the second terminal 42) by way of soldering.

Specifically, as shown in FIG. 3(a) and FIG. 3(b), the second electrical cord 32 is led out from the detection section 20 toward the flange section 11, passes through a branch section 122 made of a through hole, and arrives at the back surface 12b side of the mounting plate section 12. Of the second electrical cord 32, a portion coming out from the branch section 122 to the back surface 12b side extends in the flange section 11 direction so as to be taken along the wall portion 121b, and the tip end part 32a is approximately oriented in the negative Z direction so as to return at a position which is closer to the bottom face 11b of the flange section 11 than the connection portion 42a, which will be described later, of the second terminal 42. In this manner, the second electrical cord 32, as shown in FIG. 3(b), slackens in a claw shape. In so far as the second electrical cord 32 is concerned, a portion prior to passing through the branch section 122 from the detection section 20 is positioned at the mounting surface 12a side of the mounting plate section 12, and a portion subsequent to passing through the branch section 122 is positioned at the back surface 12b side.

Here, the second pressing section 112 is positioned to be closer to the bottom surface 11b of the flange section 11 than the connection portion 42a, which will be described later, of the second terminal 42, and presses the vicinity of a return portion of the second electrical cord 32. In this manner, as in the description of the first electrical cord 31, soldering is also easy in the second electrical cord 32, and a load applied to a soldering site between the second electrical cord 32 and the second terminal 42 is reduced. In the liquid level detection device 1 according to the embodiment, by such a structure, the reliability of electrical connection between the second electrical cord 32 and the second terminal 42 is ensured.

It is to be noted that the fact that the second pressing section 112 is positioned to be closer to the bottom surface 11b of the flange section 11 than the connection portion 42a, which will be described later, of the second terminal 42, is similar to the description of the first pressing section 111 mentioned previously. Also, the wall portion 121a also has a function to restrain the second electrical cord 32 so as not to move to the negative Y direction side.

As described above, in so far as a relationship between the first electrical cord 31 and the second electrical cord 32 is concerned, all of the first electrical cord 31 is positioned at the mounting surface 12a side of the mounting plate portion 12, whereas the second electrical cord 32 passes through the branch section 122 to thereby bypass from the mounting surface 12a side of the mounting plate section 12 to the back surface 12b side, and the tip end part 32a of the second electrical cord 32 is positioned at the back surface 12b side of the mounting plate section 12. In the liquid level detection device 1, since the first electrical cord 31 and the second electrical cord 32 are arranged on the basis of such a relationship, it is possible to reduce or eliminate contacting of the first and second electrical cords 31, 32 which are led out from the detection section 20.

Figure 4:
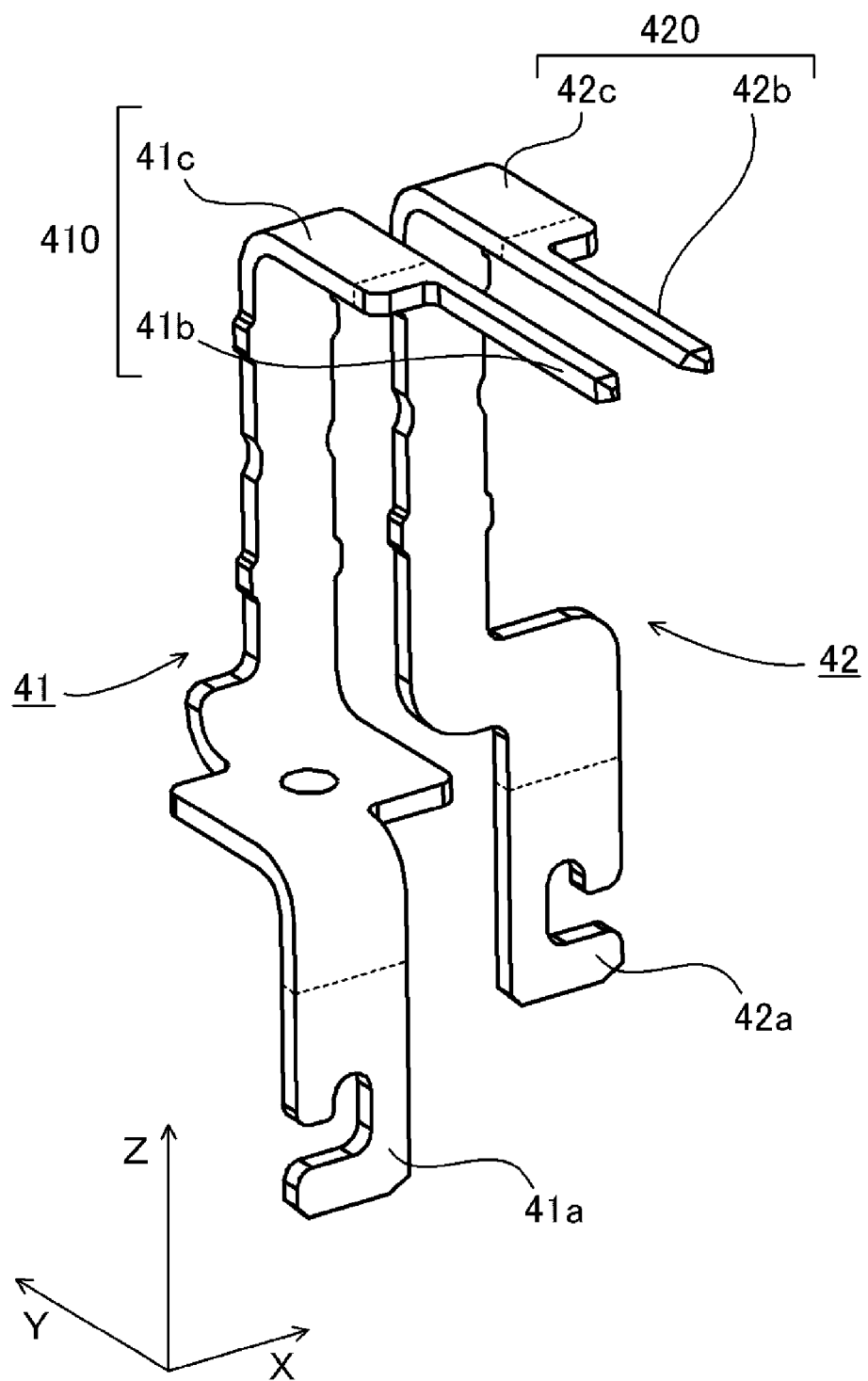
FIG. 4 is a perspective view of a first terminal and a second terminal.

The first terminal 41 and the second terminal 42 are made of a predetermined metallic material, and is formed in a substantial L-shape when these terminals are seen in the X direction, as shown in FIG. 4. The first terminal 41 and the second terminal 42 both are insert-molded in the frame body 10. In this manner, parts of the first terminal 41 and the second terminal 42 are respectively covered in contact with the flange section 11 and the connector cover section 13. It is to be noted that in FIG. 4, a boundary between a portion which is covered in contact with a resin and a portion which is not thus covered, in the first and second terminals 41, 42, is indicated by the dotted line.

In so far as the first terminal 41 is concerned, one end part thereof (an end part at the negative Z direction side) is constructed as a connection portion 41a to be connected to the tip end part 31a of the first electrical cord 31 at the bottom surface 11b side of the flange section 11, the other end part thereof arrives at the top surface 11a side of the flange section 11, and is also constructed as an external connection portion 41b which can be connected to the external device. Similarly, in so far as the second terminal 42 is concerned, one end part thereof (an end part at the negative Z direction side) is constructed as a connection portion 42a to be connected to the tip end part 32a of the second electrical cord 32 at the bottom surface 11b side of the flange section 11, and the other end part thereof arrives at the top surface 11a side of flange section 11, and is also constructed as an external connection portion 42b which can be connected to the external device.

Figure 5:
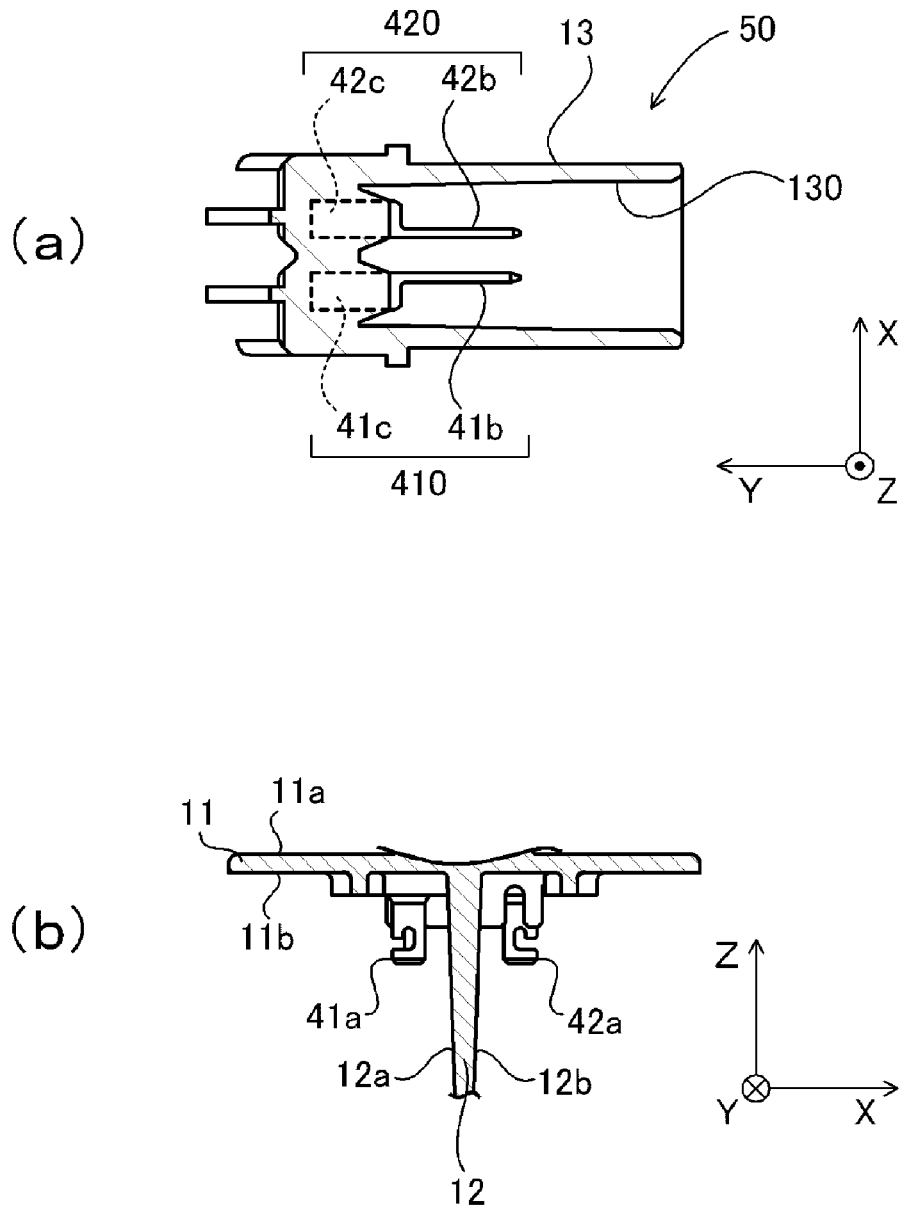
FIG. 5(a) is a sectional view of a frame body taken along the line A-A shown in FIG. 3(a).
FIG. 5(b) is a sectional view of a frame body taken along the line B-B shown in FIG. 3(b).

As shown in FIG. 4, FIG. 5(b) or the like, the connection portion 41a of the first terminal 41 is formed in a claw shape, and is connected to the tip end part 31a of the first electrical cord 31 by way of soldering. Similarly, the connection portion 42a of the second terminal 42 is formed in a claw shape, and is connected to the tip end part 32a of the second electrical cord 32 by way of soldering.

As shown in FIG. 5(a), the external connection portion 41b of the first terminal 41 is formed in a rod shape in which a tip end thereof is oriented in the negative Y direction, and the outside thereof is exposed from the connector cover section 13. Hereinafter, the external connection portion 41b is also referred to as a "first rod-shaped portion". Similarly, the external connection portion 42b of the second terminal 42 is formed in a rod shape in which a tip end thereof is oriented in the negative Y direction, and the outside thereof is exposed from the connector cover section 13. Hereinafter, the external connection portion 42b is also referred to as a "second rod-shaped portion".

The connector section 50 mentioned previously is composed of the external connection portion 41b, the external connection portion 42b, and the connector cover section 13.

As shown in FIG. 4 and FIG. 5(a), of the first terminal 41, a part of a potion which is positioned at the top surface 11a side of the flange section 11 is obtained as a first extension portion 410 extending in the Y-axis direction. Similarly, of the second terminal 42, a part of a portion which is positioned at the top surface 11a side of the flange section 11 is obtained as a second extension portion 420 extending in the Y-axis direction. The first extension portion 410 and the second extension portion 420 are adjacent to each other in a direction (namely, the X direction) which is orthogonal to a direction in which both of them extend.

The first extension portion 410 is made of the external connection portion 41b (the first rod-shaped portion) of the first terminal 41; and the first plate-shaped portion 41c formed in a shape of a plate, connecting to the external connection portion 41b. Similarly, the second extension portion 420 is made of: the external connection portion 42b (the second rod-shaped portion) of the second terminal 42; and the second plate-shaped portion 42c formed in a shape of a plate, connecting to the external connection portion 42b.

As is evident from FIG. 4 and FIG. 5(a), a width of the first plate-shaped portion 41c (a width in the X direction) is larger than a width of the external connection portion 41b (the first rod-shaped portion), and a width of the second plate-shaped portion 42c is larger than a width of the external connection portion 42b (the second rod-shaped portion). Specifically, the first plate-shaped portion 41c comes up more significantly than the external connection portion 41b (the first rod-shaped portion) in a direction which is spaced from the second extension portion 420 (namely, in the negative X direction), and the second plate-shaped portion 42c comes up more significantly than the external connection portion 42b (the second rod-shaped portion) in a direction which is spaced from the first extension portion 410 (namely, in the X direction). Reasons why the first extension 410 of the first terminal 41 and the second extension portion 420 of the second terminal 42 are thus arranged will be described below.

(1) When the first and second terminals 41, 42 are insert-molded into the frame body 10, a pressure is applied to the first and second terminals 41, 42 by resin flowing, and there has been an apprehension that the shapes of the first and second terminals 41, 42 are deformed (for example, a pressure in the negative Z direction is applied, and the first extension portion 410 and the second extension portion 420 of the first and second terminals 41, 42 go down in the negative Z direction). However, in the liquid level detection device 1 according to the embodiment, since the first and second plate-shaped portions 41c, 42c which are portions covered in contact with a resin are formed to be large in width as mentioned above, and their rigidities are ensured, such deformation can be reduced or eliminated.

(2) In a case where the rigidities of the first and second terminals 41, 42 are ensured as mentioned above, it is also possible to consider a method of causing the plate-shaped portion to come up in a direction in which the first extension portion 410 and the second extension portion 420 approach (namely, causing the plate-shaped portion to come up to the inside); and however, in this method, a distance between the external connection portions 41b and 42b cannot be reduced, making it difficult to construct the connector section 50 in small size. This is because, if an attempt is made to reduce the distance between the external connection portions 41b and 42b while the plate-shaped portion comes up to the inside in shape, there is an apprehension that the first terminal 41 and the second terminal 42 come into contact with each other at the time of insert molding. However, in the liquid level detection device 1 according to the embodiment, since the first and second plate-shaped portions 41c, 42c are formed in such a shape as to come up in a direction in which they are spaced from each other (namely, as to come up to the outside), such contacting can be reduced or eliminated.

Namely, in order to ensure the rigidities of the first and second terminals 41, 42 and to achieve downsizing of the connector section 50, in the liquid level detection device 1 according to the embodiment, the first extension portion 410 of the first terminal 41 and the second extension portion 420 of the second terminal 42 each are formed in the shape as described above.

The liquid level detection device 1 according to the embodiment is provided with: a detection section 20 having a rotation section 21 which is connected via a float 21a floating on a liquid surface of a liquid and an arm 21b, and which rotates around a predetermined rotary shaft R with displacement of the float 21a, the detection section detecting a position of the liquid surface, based on rotation of the rotation section 21; a frame body 10 having: a plate-shaped mounting plate section 12, one surface of which is a mounting surface 12a to which the detection section 20 is mounted, and the other surface of which is a back surface 12b opposite to the mounting surface 12a; and a plate-shaped flange section 11 which comes up in a direction which is orthogonal to the mounting surface 12a and the back surface 12b from one end of the mounting plate section 12, and which is mounted to a tank housing the liquid; first and second electrical cords 31, 32 which are led out from the detection section 20 toward the flange section 11; a first terminal 41, one end part of which is a connection portion 41a to be connected to a tip end part 31a of the first electrical cord 31 at the bottom surface 11b side that is a surface of the detection section 20 side of the flange section 11, and the other end of which arrives at the top surface 11a side that is a surface opposite to the bottom surface 11b of the flange section 11, and further, the other end of which is an external connection portion 42b which can be connected to a predetermined external device; and a second terminal 42, one end part of which is a connection portion 42a to be connected to a tip end part 32a of the second electrical cord 32 at the bottom surface 11b side of the flange section 11, and the other end of which arrives at the top surface 11a side of the flange section 11, and further, the other end of which is also external connection portion 42b which can be connected to the external device, wherein, at the mounting plate section 12, a branch section 122 made of a through hole is provided between the detection section 20 and the flange section 11, the second electrical cord 32 passes through the branch section 122 to thereby bypass from the mounting surface 12a side of the mounting plate section 12 to the back surface 12b side, the tip end part 32a of the second electrical cord 32 is positioned at the mounting surface side 12a side of the mounting plate section 12, the connection portion 41a of the first terminal 41 is positioned at the back surface 12a side of the mounting plate section 12, the connection portion 42a of the second terminal 42 is positioned at the back surface 12b side of the mounting plate section 12, the connection portion 41a of the first terminal 41 and the tip end part 31a of the first electrical cord 31 are connected to each other at the mounting surface 12a side of the mounting plate section 12, and the connection portion 42a of the second terminal 42 and the tip end part 32a of the second electrical cord 32 are connected to each other at the back surface 12b side of the mounting plate section 12. In this manner, as discussed previously, it is possible to reduce or eliminate contacting of the first electrical cord 31 and the second electrical cord 32 that are led out from the detection section 20.

Also, the liquid level detection device 1 is provided with: a first pressing section 111 which is positioned at the mounting surface 12a side of the mounting plate section 12, and which presses a part of the first electrical cord 31 so that the first electrical cord 31 does not substantially move in a facial direction of the mounting surface 12a; and a second pressing section 112 which is positioned at the back surface 12b side of the mounting plate section 12, and which presses a part of the second electrical cord 32 so that the second electrical cord 32 does not substantially move in a facial direction of the back surface 12b, wherein the first pressing section 111 is provided on a bottom surface 11b of the flange section 11, and the second pressing section 112 is provided on the bottom surface 11b of the flange section 11.

In this manner, as discussed previously, since the first and second electrical cords 31, 32 and the mounting plate section 12 hardly rub against each other due to vibration or the like, a risk that the first and second electrical cords 31, 32 may break can be reduced.

The first pressing section 111 is closer to the bottom surface 11b of the flange section 11 than the connection portion 41a of the first terminal 41; the first electrical cord 31 is led out from the detection section 20 toward the flange section 11, the tip end part 31a of which is oriented to the detection section 20 side so as to return at a position which is closer to the bottom surface 11b of the flange section 11 than the connection portion 41a of the first terminal 41; the second pressing section 112 is closer to the bottom surface 11b of the flange section 11 than the connection portion 42a of the second terminal 42; and the second electrical cord 32 is led out from the detection section 20 toward the flange section 11, the tip end part 32a of which is oriented to the detection section 20 side so as to return at a position which is closer to the bottom surface 11b of the flange section 11 than the connection portion 42a of the second terminal 42.

In this manner, as discussed previously, soldering between the electrical cords and terminals is easy, and a burden applied to a soldering site is reduced. Thus, the reliability of electrical connection between the electrical cords and the terminals can be ensured.

Also, on the top surface 11a of the flange section 11, there is provided a connector cover section 13 to cause external connection portions 41b, 42b of the first and second terminals 41, 42 to be exposed to the outside; a connector section 50 which can be connected to the external device is composed of the connector cover section 13 and the external connection portions 41b 42b of the first and second terminals 41, 42; the flange section 11 and the connector cover section 13 are integrally formed of a predetermined resin; of the first terminal 41, a part of a portion which is positioned at the top surface 11a side of the flange section 11 is obtained as a first extension portion 410 extending in parallel to the top surface 11a of the flange section 11; of the second terminal 42, a part of a portion which is positioned at the top surface 11a side of the flange section 11 extends in parallel to the first extension portion 410, and is obtained as a second extension portion 420 which is adjacent to the first extension portion 410; the external connection portion 41b of the first terminal 41 is obtained as a first rod-shaped portion formed in a shape of a rod; the first extension portion 410 is made of the first rod-shaped portion and a first plate-shaped portion 41c connecting to the first rod-shaped portion; the external connection portion 42b of the second terminal 42 is obtained as a second rod-shaped portion formed in a shape of a rod; the second extension portion 420 is made of the second rod-shaped portion and a second plate-shaped portion 42c formed in a shape of a plate, connecting to the second rod-shaped portion; the first plate-shaped portion 41c comes up more significantly than the first rod-shaped portion in a direction which is orthogonal to a direction in which the first extension portion 410 extends, and which is spaced from the second extension portion 420, whereby the width of the first plate-shaped portion 41c is larger than the width of the first rod-shaped portion; and the second plate-shaped portion 42c comes up more significantly than the second rod-shaped portion in a direction which is orthogonal to a direction in which the second extension portion 420 extends, and which is spaced from the first extension portion 410, whereby the width of the second plate-shaped portion 42c is larger than the width of the second rod-shaped portion, and at least parts of the first and second plate-shaped portions 41c, 42c are covered in contact with the connector cover section 13.

In this manner, as discussed previously, it is possible to ensure the rigidities of the first and second terminals 41, 42 and to achieve downsizing of the connector section 50.

Also, at the mounting plate section 12, there is provided a restraining section 120a to restrain the detection section 20 so as not to be mounted from the back surface 12b side.

In this manner, as discussed previously, incorrect assembling of the detection section 20 can be prevented.

It is to be noted that the present invention is not limited by the foregoing embodiment and drawings. It is a matter of course that modifications (including deletion of constituent element(s)) can be made. Hereinafter, some of Modification Examples will be introduced.

MODIFICATION EXAMPLES

Figure 7:
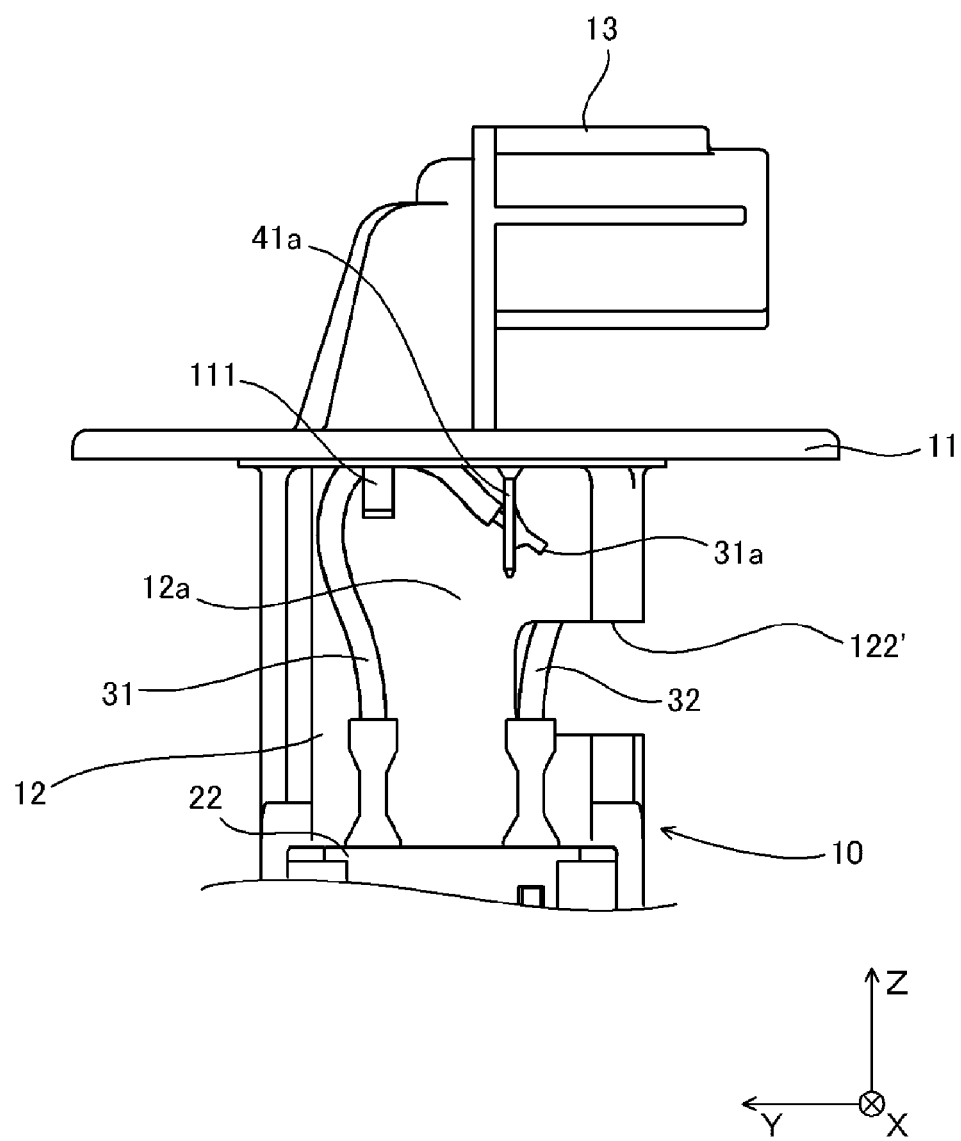
FIG. 7 is a view for explaining a branch section according to Modification Example.

Although the foregoing description showed an example in which a branch section 122 is a through hole, there may be a branch section 122' made of a cutout as shown in FIG. 7.

Also, although not shown, it may be that a first pressing section 111 is provided on a mounting surface 12a of a mounting plate section 12, and a second pressing section 112 is provided on a back surface 12b of the mounting plate section 12.

Also, a first terminal 41 and a second terminal 42 may be connected to an external device in place of providing a connector cover section 13 at a frame body 10 or in place of forming a connector section 50 (a direct couple section).

Also, as discussed previously, the first and second plate-shaped portions 41c, 42c that are large in width are formed to be folded in the Z direction, whereby the rigidities of terminals may be increased. In this case as well, in the broader sense, it is possible to say that the width of the first plate-shaped portion 41c is larger than the width of the first rod-shaped portion 41b, and the width of the second plate-shaped portion 42c is larger the width of the second rod-shaped portion 42b.

In addition, a restraining section 120a made of a protrusion portion is provided on a back surface 12b of a mounting plate section 12 which corresponds to a site which is covered with a detection section 20 of the mounting plate section 12 to thereby restrain the detection section 20 so as not to be mounted from the back surface 12b side.

Further, the restraining section 120a that is formed at the mounting surface 12a side may be a recessed portion in place of being the protrusion portion. In this case, a protrusion portion corresponding to the recessed shape is formed on a rear surface of a casing body 22 of the detection section 20, whereby the detection section 20 can be mounted from the mounting surface 12a side of the mounting plate section 12; and however, it is sufficient if the detection section cannot be mounted from the back surface 12b side.

Furthermore, while the foregoing description showed an example in which the detection section 20 is of a slide resistance type, the detection section 20 may detect a magnetic change, with rotation of a magnet which is provided at a rotation section 21, by way of an electromagnetic conversion element such as a Hall effect device, so as to thereby detect a liquid level.

In the foregoing description, in order to make it easy to comprehend the present invention, explanation of publicly known technical matters which are not essential was appropriately omitted.

INDUSTRIAL APPLICABILITY

The present invention is applicable to a liquid level detection device to detect a position of a liquid surface (a liquid level) of various kinds of liquids (such as fuels) in a tank which is included in a vehicle (such as an automotive).

DESCRIPTION OF REFERENCE NUMERALS

1 Liquid level detection device
10 Frame body
11 Flange section
11a Top surface
11b Bottom surface
111 First pressing section
112 Second pressing section
12 Mounting plate section
12a Mounting surface
12b Back surface
120a Restraining section
121a, 121b Wall portions
122 Branch section
13 Connector cover section
20 Detection section
21 Rotation section
R Rotary shaft
21a Float
21b Arm
22 Casing body
31 First electrical cord
31a Tip end part
32 Second electrical cord
32a Tip end part
41 First terminal
410 First extension portion
41a Connection portion
41b External connection portion (first rod-shaped portion)
41c First plate-shaped portion
42 Second terminal
420 Second extension portion
42a Connection portion
42b External connection portion (second rod-shaped portion)
42c Second plate-shaped portion
50 Connector section

The invention claimed is:

1. A liquid level detection device comprising:
a detection section having a rotation section which is connected via a float floating on a liquid surface of a liquid and an arm, and which rotates around a predetermined rotary shaft with displacement of the float, the detection section detecting a position of the liquid surface, based on rotation of the rotation section;
a frame body having:
a plate-shaped mounting plate section, one surface of which is a mounting surface to which the detection section is mounted, and the other surface of which is a back surface opposite to the mounting surface; and
a plate-shaped flange section which comes up in a direction which is orthogonal to the mounting surface and the back surface from one end of the mounting plate section, and which is mounted to a tank housing the liquid;
first and second electrical cords which are led out from the detection section toward the flange section;
a first terminal, one end part of which is a connection portion to be connected to a tip end part of the first electrical cord at the bottom surface side that is a surface at the detection section side of the flange section, and the other end of which arrives at the top surface side that is a surface opposite to the bottom surface of the flange section, and further, the other end of which is an external connection portion which can be connected to a predetermined external device; and
a second terminal, one end part of which is a connection portion to be connected to a tip end part of the second electrical cord at the bottom surface side of the flange section, and the other end of which arrives at the top surface side of the flange section, and further, the other end of which is an external connection portion section which can be connected to the external device,
wherein, at the mounting plate section, a branch section made of a through hole or a cutout is provided between the detection section and the flange section,
the second electrical cord passes through the branch section to thereby bypass from the mounting surface side of the mounting plate section to the back surface side,
the tip end part of the second electrical cord is positioned at the back surface side of the mounting plate section,
the connection portion of the first terminal is positioned at the mounting surface side of the mounting plate section,
the connection portion of the second terminal is positioned at the back surface side of the mounting plate section,
the connection portion of the first terminal and the tip end part of the first electrical cord are connected to each other at the mounting surface side of the mounting plate section, and
the connection portion of the second terminal and the tip end part of the second electrical cord are connected to each other at the back surface side of the mounting plate section.

2. The liquid level detection device according to claim 1, comprising:
a first pressing section which is positioned at the mounting surface side of the mounting plate section, and which presses a part of the first electrical cord so that the first electrical cord does not substantially move in a facial direction of the mounting surface; and
a second pressing section which is positioned at the back surface side of the mounting plate section, and which presses a part of the second electrical cord so that the second electrical cord does not substantially move in a facial direction of the back surface,
wherein the first pressing section is provided on a bottom surface of the flange section or on the mounting surface of the mounting plate section, and
the second pressing section is provided on the bottom surface of the flange section or on the back surface of the mounting plate section.

3. The liquid level detection device according to claim 2, wherein
the first pressing section is closer to the bottom surface of the flange section than the connection portion of the first terminal, the first electrical cord is led out from the detection section toward the flange section, the tip end part of which is oriented to the detection section side so as to return at a position which is closer to the bottom surface of the flange section than the connection portion of the first terminal, the second pressing section is closer to the bottom surface of the flange section than the connection portion of the second terminal, and the second electrical cord is led out from the detection section toward the flange section, the tip end part of which is oriented to the detection section side so as to return at a position which is closer to the bottom surface of the flange section than the connection portion of the second terminal.

4. The liquid level detection device according to claim 1, wherein, on the top surface of the flange section, there is provided a connector cover section to cause external connection portions of the first and second terminals to be exposed to an outside thereof, a connector section which can be connected to the external device, which is composed of the connector cover section and the external connection portions of the first and second terminals, the flange section and the connector cover section are integrally formed of a predetermined resin, of the first terminal, a part of a portion which is positioned at the top surface side of the flange section is obtained as a first extension portion extending in parallel to the top surface of the flange section, of the second terminal, a part of a portion which is positioned at the top surface side of the flange section extends in parallel to the first extension portion, and is obtained as a second extension portion which is adjacent to the first extension portion, the external connection portion of the first terminal is obtained as a first rod-shaped portion formed in a shape of a rod;

the first extension portion is made of the first rod-shaped portion and a first plate-shaped portion connecting to the first rod-shaped portion, the external connection portion of the second terminal is obtained as a second rod-shaped portion formed in a shape of a rod, the second extension portion is made of the second rod-shaped portion and a second plate-shaped portion formed in a shape of a plate, connecting to the second rod-shaped portion, the first plate-shaped portion comes up more significantly than the first rod-shaped portion in a direction which is orthogonal to a direction in which the first extension portion extends, and which is spaced from the second extension portion, whereby a width of the first plate-shaped portion is larger than a width of the first rod-shaped portion, the second plate-shaped portion comes up more significantly than the second rod-shaped portion in a direction which is orthogonal to a direction in which the second extension portion extends, and which is spaced from the first extension portion, whereby a width of the second plate-shaped portion is larger than a width of the second rod-shaped portion, and at least parts of the first and second plate-shaped portions are covered in contact with the connector cover section.

5. The liquid level detection device according to claim 1, the mounting plate section is further provided with a restraining section to restrain the detection section so as not to be mounted from the back surface side.

* * * * *